United States Patent
Kim et al.

(10) Patent No.: US 8,811,280 B2
(45) Date of Patent: Aug. 19, 2014

(54) METHOD OF TRANSMITTING CONTROL SIGNAL IN MULTI-CELL COOPERATIVE WIRELESS COMMUNICATION SYSTEM

(75) Inventors: Hyung Tae Kim, Gyeongki-do (KR); Han Byul Seo, Gyeongki-do (KR); Byoung Hoon Kim, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 309 days.

(21) Appl. No.: 13/063,373

(22) PCT Filed: Sep. 22, 2009

(86) PCT No.: PCT/KR2009/005392
§ 371 (c)(1),
(2), (4) Date: Mar. 10, 2011

(87) PCT Pub. No.: WO2010/036006
PCT Pub. Date: Apr. 1, 2010

(65) Prior Publication Data
US 2011/0164572 A1     Jul. 7, 2011

Related U.S. Application Data

(60) Provisional application No. 61/099,900, filed on Sep. 24, 2008.

(30) Foreign Application Priority Data

Nov. 5, 2008   (KR) .................. 10-2008-0109483

(51) Int. Cl.
*H04W 4/00*     (2009.01)
*H04B 7/02*     (2006.01)
*H04W 56/00*    (2009.01)
*H04L 1/00*     (2006.01)

(52) U.S. Cl.
CPC ............... *H04W 56/00* (2013.01); *H04B 7/024* (2013.01); *H04L 2001/0097* (2013.01); *H04L 1/0025* (2013.01)

USPC ........... 370/328; 370/329; 370/338; 370/331; 455/501; 455/436; 375/226; 375/267

(58) Field of Classification Search
USPC ......... 370/252, 338, 432, 331, 343, 328–329; 455/68, 63.1, 450, 436; 375/219, 226, 375/267, 296
See application file for complete search history.

(56) References Cited

U.S. PATENT DOCUMENTS

| | | | |
|---|---|---|---|
| 4,563,671 A | * | 1/1986 | Lim et al. ....................... 382/245 |
| 7,889,755 B2 | * | 2/2011 | Malladi et al. ................ 370/432 |

(Continued)

FOREIGN PATENT DOCUMENTS

| | | |
|---|---|---|
| KR | 2008-0037398 | 4/2008 |
| WO | 02/15613 | 2/2002 |

OTHER PUBLICATIONS

Internatioal Search Report from PCT/KR2009/005392.

*Primary Examiner* — Charles C Jiang
*Assistant Examiner* — Mohamed Kamara
(74) *Attorney, Agent, or Firm* — Morgan, Lewis & Bockius LLP

(57) ABSTRACT

A method and apparatus of transmitting a control signal in a multi-cell cooperative wireless communication system is provided. The method comprises transmitting to a first user equipment a first control signal for first downlink data by a serving base station and transmitting to the first user equipment a second control signal for second downlink data received from a neighboring base station by the serving base station, wherein the first downlink data is data for the first user equipment, and the second downlink data is data for a second user equipment in a neighbor cell and is restorable by the first user equipment.

8 Claims, 7 Drawing Sheets

(56) References Cited

U.S. PATENT DOCUMENTS

| | | |
|---|---|---|
| 7,961,699 B2 * | 6/2011 | Morimoto et al. ............ 370/344 |
| 8,160,013 B2 * | 4/2012 | Kim et al. .................... 370/329 |
| 8,687,562 B2 * | 4/2014 | Iyer et al. ..................... 370/329 |
| 2005/0281228 A1 * | 12/2005 | Oh et al. ....................... 370/331 |
| 2006/0146826 A1 * | 7/2006 | Namihira ...................... 370/392 |
| 2007/0010251 A1 * | 1/2007 | Cho et al. ..................... 455/436 |
| 2007/0064666 A1 * | 3/2007 | Kwun et al. .................. 370/343 |
| 2007/0165732 A1 * | 7/2007 | Gerlach ........................ 375/260 |
| 2008/0132262 A1 | 6/2008 | Jung et al. |
| 2008/0166975 A1 * | 7/2008 | Kim et al. ....................... 455/68 |

\* cited by examiner

METHOD OF TRANSMITTING CONTROL SIGNAL IN MULTI-CELL COOPERATIVE WIRELESS COMMUNICATION SYSTEM

The present application is a national stage of PCT International Application No. PCT/KR2009/005392, filed Sep. 22, 2009, and claims the benefit of U.S. Provisional Application No. 61/099,900, filed Sep. 24, 2008. The present national stage application also claims the benefit of Korean Patent Application No. 10-2008-0109483, filed Nov. 5, 2008.

TECHNICAL FIELD

The present invention relates to wireless communications, and more particularly, to a method of transmitting a control signal in a multi-cell cooperative wireless communication system.

BACKGROUND ART

In next generation multimedia mobile communication systems, which have been actively studied in recent years, there is a demand for a system capable of processing and transmitting a variety of information (e.g., video and radio data) at a higher data rate in addition to the early-stage voice service.

Orthogonal frequency division multiplexing (OFDM) capable of having a high data rate has drawn attention in recent years. The OFDM is a multi-carrier modulation scheme for transmitting data by dividing a frequency band into a plurality of orthogonal subcarriers. Orthogonal frequency division multiple access (OFDMA) is a scheme for providing multi-user multiplexing by combining the OFDM with frequency division multiple access (FDMA), time division multiple access (TDMA), or code division multiple access (CDMA).

A wireless communication system includes a base station (BS) and at least one user equipment (UE). The UE may be fixed or mobile, and may be referred to as another terminology, such as a mobile station (MS), a user terminal (UT), a subscriber station (SS), a wireless device, etc. The BS is generally a fixed station that communicates with the UE and may be referred to as another terminology, such as an evolved node-B (eNB), a base transceiver system (BTS), an access point, etc. Hereinafter, an uplink (UL) denotes a communication link from the UE to the BS, and a downlink (DL) denotes a communication link from the BS to the UE.

For effective system configuration, the wireless communication system has a cell structure. A cell is a region in which a wide area is divided into small areas for effective frequency use. In general, the BS is installed in a center of the cell to relay the UE, and the cell corresponds to a service area of one BS.

If the same subcarrier is used by neighbor cells of an OFDM/OFDMA system in a multi-cell environment, users may experience interference. This is referred to as inter-cell interference. In particular, the inter-cell interference is seriously problematic for a UE located near a cell boundary. When the UE is located near the cell boundary in DL transmission, the UE experiences strong interference from the neighbor cells. When the UE is located near the cell boundary in UL transmission, the UE produces strong interference to the neighbor cells, and has a low data rate due to a path loss in a serving cell.

A multi-cell cooperation scheme supporting inter-cell cooperation is proposed to reduce inter-cell interference and to satisfy high data rate and system performance. A new type of control signal is required when using the multi-cell cooperation scheme. In addition, inter-cell signal processing requires a large amount of control signals, and thus there is a need for an effective control mechanism.

A multi-cell cooperation scheme supporting inter-cell cooperation requires a new type of control signal and control mechanism.

DISCLOSURE OF INVENTION

Technical Problem

The present invention provides a control signal supporting inter-cell cooperation in a multi-cell cooperative wireless communication system.

The present invention also provides a control mechanism supporting inter-cell cooperation in a multi-cell cooperative wireless communication system.

Technical Solution

According to an aspect of the present invention, a method of transmitting a control signal in a multi-cell cooperative wireless communication system comprises transmitting to a first user equipment a first control signal for first downlink data by a serving base station and transmitting to the first user equipment a second control signal for second downlink data received from a neighboring base station by the serving base station, wherein the first downlink data is data for the first user equipment, and the second downlink data is data for a second user equipment in a neighbor cell and is restorable by the first user equipment.

According to another aspect of the present invention, a method of transmitting a control signal in a multi-cell cooperative wireless communication system comprises transmitting to a first user equipment a first control signal for first downlink data by a serving base station and transmitting to the first user equipment a second control signal for second downlink data by a neighbor base station, wherein the first downlink data is data for the first user equipment, and the second downlink data is data for a second user equipment in a neighbor cell and is restorable by the first user equipment.

The second control signal may comprise information required for restoration of the second downlink data.

The second control signal may comprise at least one of radio resource region information, a modulation and coding scheme (MCS) level, reference signal (RS) information, a user identifier, and a flag indicating whether to discard the second downlink data after restore.

The RS information may comprise at least one of an RS index, a cell index, a user index, and an RS pattern.

The user identifier may be an identifier for the second user equipment or a common identifier.

If the flag is '1', the second downlink data may be regarded as data of a corresponding user equipment, and if the flag is '0', the second downlink data may be discarded.

The second control signal may be cyclic redundancy check (CRC)-masked with a user address of the first user equipment.

The second control signal may be CRC-masked with a user identifier of the second user equipment or a common identifier.

According to another aspect of the present invention, a method of processing data in a multi-cell cooperative wireless communication system comprises receiving a first control signal for first downlink data and a second control signal for second downlink data, receiving the first downlink data from a serving cell and the second downlink data from a neighbor cell, removing interference caused by the second downlink data by restoring the second downlink data and restoring the first downlink data in a state where the interference caused by the second downlink data is removed.

The second control signal may be received from the serving cell or the neighbor cell.

The second control signal may comprise information required for restore of the second downlink data.

The second control signal may comprise at least one of radio resource region information, an MCS level, RS information, a user identifier, and a flag indicating whether the second downlink data needs to be discarded after restore.

The RS information may comprise at least one of an RS index, a cell index, a user index, and an RS pattern.

If the flag is '1', the second downlink data may be regarded as data of a corresponding user equipment, and if the flag is '0', the second downlink data may be discarded.

The second control signal may be CRC-masked with a user identifier.

According to another aspect of the present invention, a user equipment comprises a radio frequency (RF) unit for transmitting and receiving a radio signal and a processor connected to the RF unit and configured to receive a first control signal for first downlink data and a second control signal for second downlink data, receive the first downlink data from a serving cell and the second downlink data from a neighbor cell, remove interference caused by the second downlink data by restoring the second downlink data, and restore the first downlink data in a state where the interference caused by the second downlink data is removed.

According to another aspect of the present invention, a method of transmitting a control signal in a multi-cell cooperative wireless communication system comprises transmitting to a user equipment a first control signal for first uplink data and a second control signal for second uplink data and transmitting to a neighbor base station the second control signal for the second uplink data, wherein the first uplink data is restorable in only a serving cell, and the second uplink data is restorable in both the serving cell and a neighbor cell.

The second control signal may comprise information required for restore of the second uplink data.

The second control signal may comprise at least one of radio resource region information, an MCS level, RS information, and a user identifier.

The RS information may comprise at least one of an RS index, a cell index, a user index, and an RS pattern.

The user identifier may be an identifier for the user equipment or a common identifier.

Advantageous Effects

It is possible to obtain a new type of control signal and control mechanism for supporting inter-cell cooperation when downlink data transmission and uplink data transmission are achieved in a multi-cell cooperative wireless communication system.

MODE FOR THE INVENTION

Figure 1:
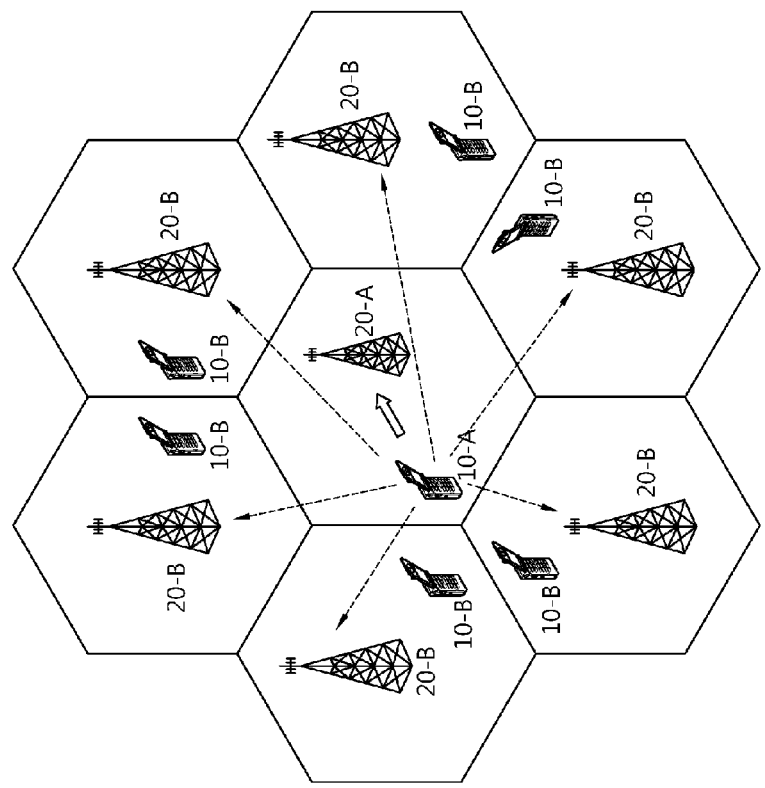
FIG. 1 shows an example of a wireless communication system in a multi-cell environment.

FIG. 1 shows an example of a wireless communication system in a multi-cell environment.

Referring to FIG. 1, the wireless communication system includes a base station (BS) 20 and at least one user equipment (UE) 10. The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers. In downlink transmission, the transmitter may be a part of the BS 20, and the receiver may be a part of the UE 10. In uplink transmission, the transmitter may be a part of the UE 10, and the receiver may be a part of the BS 20.

The BS 20 may belong to at least one cell. The cell is a region in which the BS 20 provides a communication service. A plurality of BSs having at least one cell may be arranged to establish a multi-cell configuration. A BS providing the UE 10 with the communication service is referred to as a serving BS. A BS adjacent to the serving BS is referred to as a neighbor BS. A cell of the serving BS is referred to as a serving cell. A cell of the neighbor BS is referred to as a neighbor cell.

Assume that a $BS_A$ 20-A provides a $UE_A$ 10-A with a communication service and a $BS_B$ 20-B provides a $UE_B$ 10-B with a communication service. From the perspective of the $UE_A$ 10-A, the $BS_A$ 20-A is a serving BS and the $BS_B$ 20-B is a neighbor BS. From the perspective of the $UE_B$ 10-B, the $BS_B$ 20-B is a serving BS, and the $BS_A$ 20-A is a neighbor BS. Assume that the $UE_A$ 10-A and the $UE_B$ 10-B are located in boundaries of their serving cells. The $BS_A$ 20-A performs scheduling to allocate a radio resource to the $UE_A$ 10-A, and transmits downlink (DL) data. The DL data transmitted by the $BS_B$ 20-B can be received not only by the $UE_B$ 10-B but also by the $UE_A$ 10-A. Therefore, the DL data of the $BS_B$ 20-B may act as strong interference to the $UE_A$ 10-A. The $UE_A$ 10-A transmits uplink (UL) data by using the allocated radio resource. The UL data transmitted by the $UE_A$ 10-A can be received not only by the $BS_A$ 20-A but also by the $BS_B$ 20-B. Therefore, the UL data of the $UE_A$ 10-A may act as strong interference to the $BS_B$ 20-B. Since an OFDMA system has an orthogonality in a frequency domain in the same cell, UEs using different frequency bands do not interfere with each other. The orthogonality is not maintained between UEs using the same frequency band in neighbor cells, and thus interference may occur. If the $BS_A$ 20-A and the $BS_B$ 20-B cooperate with each other, antennas located in each BS operate by considering UEs located in different cells. That is, the OFDMA system can be regarded as a multi-antenna system in which antennas are distributed over several cells. A scheme in which the $BS_A$ 20-A and the $BS_B$ 20-B cooperate with each other can be referred to as a multi-cell cooperation scheme.

In general, a control signal can be classified into a control signal for UL data transmission and a control signal for DL data transmission. The control signal for DL data transmission may include radio resource region information, a modulation and a coding scheme (MCS) level, reference signal (RS) information, a user identifier, etc. The radio resource region (i.e., DL-MAP or resource allocation) information is information regarding a radio resource occupied by each UE which receives DL data. Upon receiving the control signal from the BS, the UE verifies its radio resource region by using the radio resource region information, estimates a channel by referencing the RS information, and decodes data based on the MCS level. By the user identifier, the control signal and data transmitted from the BS are identified for each UE. The control signal for UL data transmission serves to transmit control information (e.g., the radio resource region information, the MCS level, etc.) by the BS to the UE.

In the multi-cell cooperative wireless communication system, UL data or DL data may be transmitted by being divided to multiple layers so as to reduce inter-cell interference and to improve system performance. A new control signal and a new control mechanism are required for the data transmitted by being divided to multiple layers.

A control signal for transmitting and processing DL data in a multi-cell cooperative wireless communication system will be described.

Figure 2:
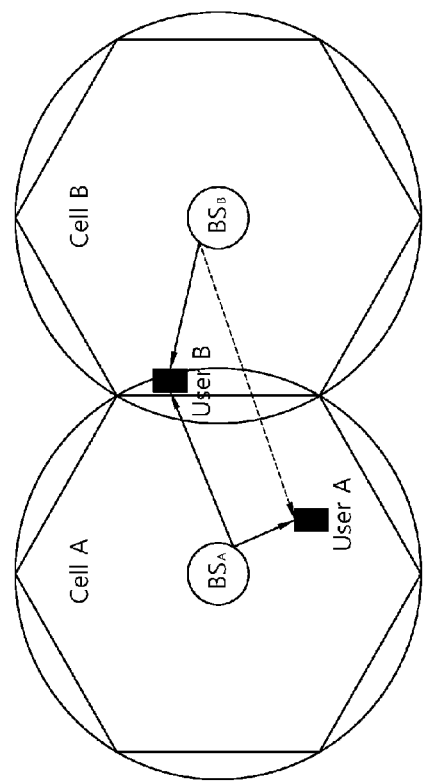
FIG. 2 shows an operation of transmitting downlink data based on inter-cell cooperation.

FIG. 2 shows an operation of transmitting DL data based on inter-cell cooperation.

Referring to FIG. 2, a user A is located in a center of a cell A, and a user B is located at a boundary of a cell B. A BS A belongs to the cell A, and a BS B belongs to the cell B. From the perspective of the user A, the cell A is a serving cell, and the cell B is a neighbor cell. From the perspective of the user B, the cell B is a serving cell, and the cell A is a neighbor cell. The cell A and the cell B use the same time and frequency bands, and the user B is located in the boundary of the cell B. Thus, the user B may experience strong interference caused by the cell A. Since the user A is located in the center of the cell A, the user A may experience relatively weak interference caused by the cell B. The cell A and the cell B can share scheduling information for time and frequency resources. It is assumed that the cell A intends to reduce DL interference acting on the user B.

Figure 3:
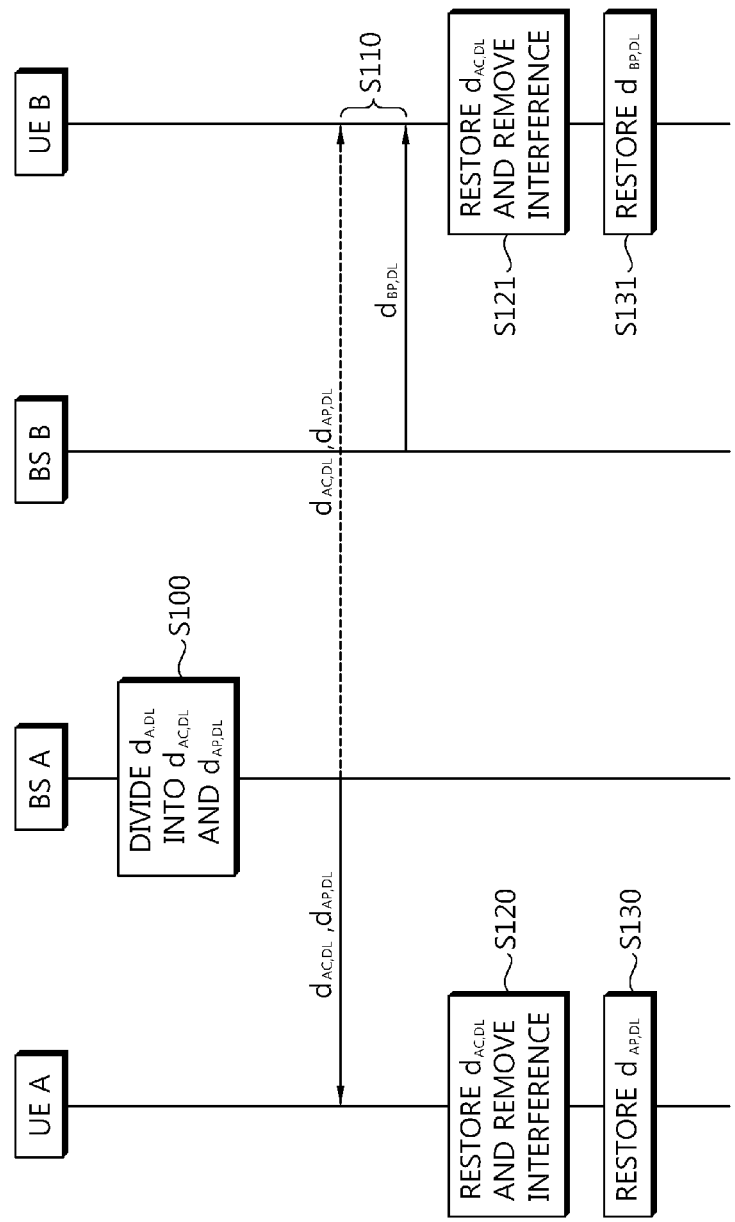
FIG. 3 is a flowchart showing a method of transmitting downlink data based on inter-cell cooperation according to an embodiment of the present invention.

FIG. 3 is a flowchart showing a method of transmitting DL data based on inter-cell cooperation according to an embodiment of the present invention. For convenience of explanation, the following description will be based on the cells and users exemplified in FIG. 2.

Referring to FIG. 3, a BS A divides DL data $d_{A,DL}$ for a UE A into common data $d_{Ac,DL}$ and private data $d_{Ap,DL}$ (step S100). The common data $d_{Ac,DL}$ is defined as data that can be restored by both the UE A and a UE B. The private data $d_{Ap,DL}$ is defined as data that can be restored by the UE A and but cannot be restored by the UE B.

The BS A transmits the common data $d_{Ac,DL}$ and/or private data $d_{Ap,DL}$ for the UE A in downlink, and a BS B transmits private data $d_{Bp,DL}$ for the UE B in downlink by a radio resource overlapping with that used for the UE A (step S110). The private data $d_{Bp,DL}$ for UE B is defined as data that can be restored by the UE B but cannot be restored by the UE A. In step S110, the BS A can simultaneously transmit the common data $d_{Ac,DL}$ and the private data $d_{Ap,DL}$ by superposition coding or the like. Although the BS A transmits the common data $d_{Ac,DL}$ and the private data $d_{Ap,DL}$ to the UE A, the UE B can receive the common data $d_{Ac,DL}$ and the private data $d_{Ap,DL}$ since the UE B is located at a boundary of a cell A and a cell B.

The UE A restores the common data $d_{Ac,DL}$, and removes interference (step S120). The UE B also restores the common data $d_{Ac,DL}$, and removes interference (step S121). In step S120, the UE A restores the common data $d_{Ac,DL}$ in a state where interference caused by the private data $d_{Ap,DL}$ exists, and removes interference caused by the common data $d_{Ac,DL}$. The UE A performs a suitable process by recognizing the common data $d_{Ac,DL}$ as data of the UE A. In step S121, the UE B restores the common data $d_{Ac,DL}$ in a state where interference caused by the private data $d_{Ap,DL}$ and $d_{Bp,DL}$ exists, and removes interference caused by the common data $d_{Ac,DL}$. The UE B restores the common data $d_{Ac,DL}$ and removes interference. The UE B may utilize the common data $d_{Ac,DL}$ for various purposes or discard it according to a flag bit included in a second control signal.

After removing the interference, the UE A restores the private data $d_{Ap,DL}$ (step S130). After removing the interference, the UE B restores the private data $d_{Bp,DL}$ (step S131).

Accordingly, from the perspective of the UE B, there is an advantage as if the BS A transmits DL data by decreasing power to reduce interference acting on the UE B. In addition, from the perspective of the BS A, transmit (Tx) power and a data rate can be maintained to the maximum extent possible while minimizing interference on the UE B.

As described above with reference to FIG. 3, it is necessary for each UE to be capable of receiving both the private data $d_{Ap,DL}$ or $d_{Bp,DL}$ and the common data $d_{Ac,DL}$. For such an operation, there is a need to define a new control signal and a new method of transmitting the control signal.

Figure 4:
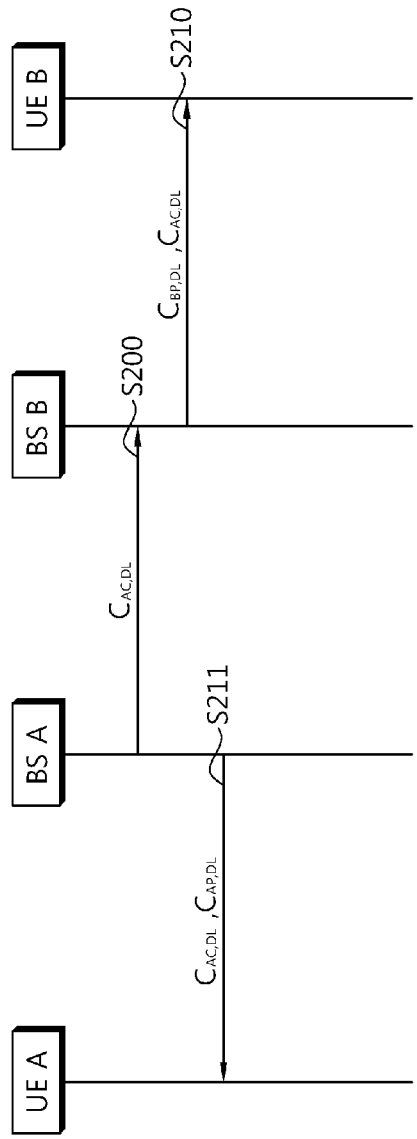
FIG. 4 is a flowchart showing a method of transmitting a control signal for downlink data transmission according to an embodiment of the present invention.

FIG. 4 is a flowchart showing a method of transmitting a control signal for DL data transmission according to an embodiment of the present invention. For convenience of explanation, the following description will be based on the cells and users exemplified in FIG. 2.

Referring to FIG. 4, a BS B receives from a BS A a control signal $C_{Ac,DL}$ for common data $d_{Ac,DL}$ for a UE A (step S200). Since neighbor BSs can cooperate with each other, the control signal can be exchanged between the BSs.

The BS B transmits to a UE B (i.e., a first UE) a control signal $C_{Bp,DL}$ (i.e., a first control signal) for private data $d_{Bp,DL}$ (i.e., first DL data) of the UE B and the control signal $C_{Ac,DL}$ (i.e., a second control signal) received in step 200 for the common data $d_{Ac,DL}$ (i.e., second DL data) of the UE A (step S210). In addition thereto, the BS A may transmit to the UE A (i.e., a second UE) a control signal $C_{Ap,DL}$ for private data $d_{Ap,DL}$ of the UE A and the control signal $C_{Ac,DL}$ for the common data $d_{Ac,DL}$ (step S211).

The BS B transmits only the private data $d_{Bp,DL}$ for the UE B in downlink. However, since the UE B is located at a boundary of a cell A and a cell B, the UE B can receive a signal transmitted by the BS A to the UE A. Therefore, the UE B restores the signal received from the BS A and removes interference from the signal. Thereafter, the UE B restores the private data $d_{Bp,DL}$. In this case, the UE B requires control information for restoring the signal received from the BS A. That is, the UE B can receive from the BS B the control signal $C_{Ac,DL}$ required for restore of the common data $d_{Ac,DL}$.

The control signal $C_{Ac,DL}$ may include radio resource region information, an MCS level, RS information, a user identifier (or user address), and a flag indicating whether to discard the common data $d_{Ac,DL}$ after restore.

The control signals $C_{Ac,DL}$, $C_{Ap,DL}$, and $C_{Bp,DL}$ may be transmitted by being cyclic redundancy check (CRC)-masked with an user identifier (or user address). That is, the BS B may transmit to the UE B the control signal $C_{Bp,DL}$ which is CRC-masked with an identifier of the UE B. The BS B may transmit to the UE B the control signal $C_{Ac,DL}$ which is CRC-masked with a common identifier or the identifier of the UE B. In addition, the BS A may transmit to the UE A the control signals $C_{Ap,DL}$ which are CRC-masked with an identifier of the UE A. The BS A may transmit to the UE A the control signal $C_{Ac,DL}$ which is CRC-masked with a common identifier or the identifier of the UE A. Therefore, the UE A (or UE B) performs CRC checking upon receiving the control signal, and can determine whether the control signal is received for the UE A (or UE B).

Figure 5:
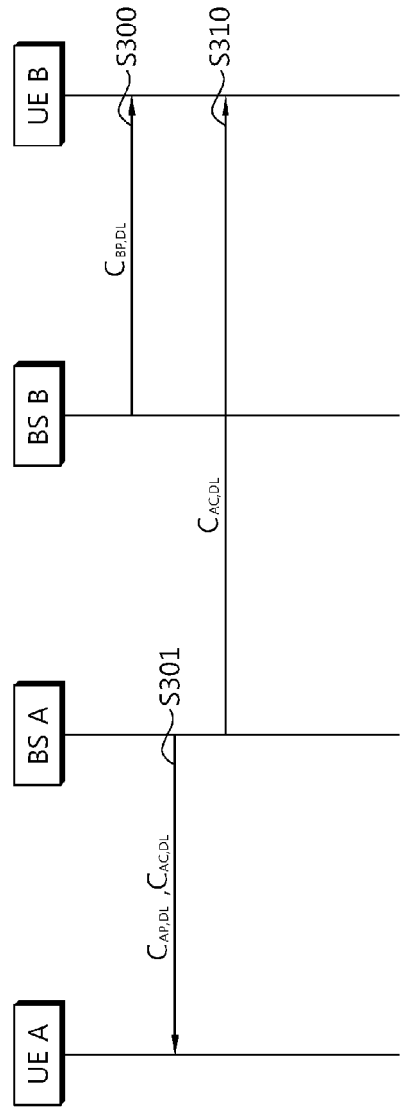
FIG. 5 is a flowchart showing a method of transmitting a control signal for downlink data transmission according to another embodiment of the present invention.

FIG. 5 is a flowchart showing a method of transmitting a control signal for DL data transmission according to another embodiment of the present invention.

Referring to FIG. 5, a BS B transmits to a UE B (i.e., a first UE) a control signal $C_{Bp,DL}$ (i.e., a first control signal) for private data $d_{Bp,DL}$, (i.e., first data) of the UE B (step S300). In addition thereto, a BS A transmits to a UE A (i.e., a second UE) a control signal $C_{Ap,DL}$ for private data $d_{Ap,DL}$ of the UE A and a control signal $C_{Ac,DL}$ for common data $d_{Ac,DL}$ of the UE A (step S301). The BS A transmits to the UE B (i.e., the first UE) a control signal $C_{Ac,DL}$ (i.e., a second control signal) for common data $d_{Ac,DL}$ (i.e., second DL data) of the UE A (step S310). Instead of step S310, a signal transmitted by the BS A to the UE A in step 301 may be received and used by the UE B.

The BS B transmits only the private data $d_{Bp,DL}$ for the UE B in downlink. However, since the UE B is located at a boundary of a cell A and a cell B, the UE B can receive a signal transmitted by the BS A to the UE A. Therefore, the UE B restores the signal received from the BS A and removes interference from the signal. Thereafter, the UE B restores the private data $d_{Bp,DL}$. In this case, the UE B requires control information for restoring the signal received from the BS A. That is, the UE B can receive from the BS A the control signal $C_{Ac,DL}$ for common data required for restore of the common data $d_{Ac,DL}$.

The control signal $C_{Ac,DL}$ may include radio resource region information, an MCS level, RS information, a user identifier, and a flag indicating whether to discard the common data $d_{Ac,DL}$ after restore.

The control signal $C_{Ac,DL}$ may be transmitted by being CRC-masked with a user identifier. The UE B has to be able to restore the control signal $C_{Ac,DL}$ received from the BS A. For this, if the BS A transmits the control signal $C_{Ac,DL}$ to a UE (e.g., UE B) participating in cooperation, the control signal $C_{Ac,DL}$ may be transmitted by being CRC-masked with a common identifier. The common identifier is commonly applied to a plurality of UEs participating in cooperation. If the UE B receives the control signal, the UE B has to determine whether there is a control signal received with not only an identifier of the UE B but also the common identifier. The control signal received with the common identifier may include an additional user identifier to indicate a specific UE for which the control signal is received. Instead of masking with a common identifier, the BS A can transmit to the UE B the control signal CAc,DL which is CRC-masked with an identifier of the UE A. This has to be reported to the UE B by the BS A or the BS B by an additional signal.

Hereinafter, a control signal required by the UE B to receive the common data $d_{Ac,DL}$ according to the embodiments of FIG. 4 and FIG. 5 will be described in detail.

The control signal $C_{Ac,DL}$ may include radio resource region information, an MCS level, RS information, a user identifier, and a flag indicating whether to discard the common data $d_{Ac,DL}$ after restore.

Figure 6:
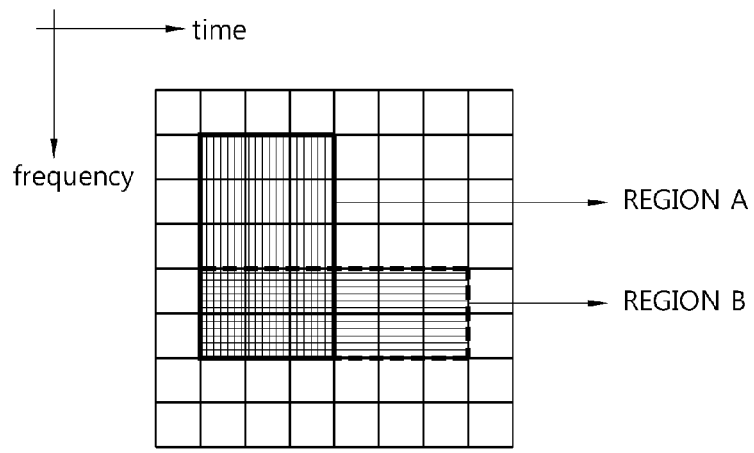
FIG. 6 shows an example of a radio resource region according to an embodiment of the present invention.

FIG. 6 shows an example of a radio resource region according to an embodiment of the present invention.

Referring to FIG. 6, a region A is a region for carrying private data $d_{Ap,DL}$ and common data $d_{Ac,DL}$ transmitted for a UE A by a BS A. A region B is a region for carrying private data $d_{Bp,DL}$ transmitted for a UE B by a BS B. The private data $d_{Ap,DL}$ and common data $d_{Ac,DL}$ for the UE A and the private data $d_{Bp,DL}$ for the UE B can be carried in a portion where the region A is superposed with the region B. From the perspective of the UE B, data transmitted for the UE A and carried in the portion where the region A is superposed with the region B may act as interference. Therefore, after restoring the common data $d_{Ac,DL}$ in a state where interference caused by the private data $d_{Ap,DL}$ and private data $d_{Bp,DL}$ exist, the UE B removes interference caused by the common data $d_{Ac,DL}$, and restores the private data $d_{Bp,DL}$ for the UE B. Accordingly, the UE B can decrease interference from the BS A.

In order to restore the common data $d_{Ac,DL}$, the UE B has to know information on a radio resource region for carrying the common data $d_{Ac,DL}$. Therefore, a control signal $C_{Ac,DL}$ may include information on the radio resource region for carrying the common data $d_{Ac,DL}$.

The control signal $C_{Ac,DL}$ may include an MCS level. The common data $d_{Ac,DL}$ has to be restorable by both the UE A and the UE B. Therefore, among MCS levels that can be received by the UE A and the UE B, the MCS level of the common data $d_{Ac,DL}$ has to be set to an MCS level having a low data rate.

The control signal $C_{Ac,DL}$ may include RS information. The UE B can estimate a channel by the RS information, and can calculate a value for data restore. The UE B receives the private data $d_{Bp,DL}$ for the UE B from the BS B, and receives the common data $d_{Ac,DL}$ for the UE A from the BS A. Therefore, the RS information differs for each of the private data $d_{Bp,DL}$ for the UE B and the common data $d_{Ac,DL}$. In addition, from the perspective of the UE A, the UE A receives the private data $d_{Ap,DL}$ and the common data $d_{Ac,DL}$ from the BS A. In this case, for effective channel estimation, the RS information may differ for each of the private data $d_{Ap,DL}$ and the common data $d_{Ac,DL}$. Examples of the RS information include an RS index, a cell index, a user index, an RS pattern, etc.

The control signal $C_{Ac,DL}$ may include a user identifier. The private data $d_{Ap,DL}$ and the common data $d_{Ac,DL}$ received by the UE B from the BS A are data for the UE A. Therefore, in order to restore the data received by the UE B, the user identifier is required to indicate a specific UE for which the data is transmitted. An identifier for the common data $d_{Ac,DL}$ of the UE A may be an identifier of the UE A or a common identifier. If the identifier for the common data $d_{Ac,DL}$ is the identifier of the UE A, the BS A or the BS B has to inform the UE B of the fact that the identifier of the UE A is used for the common data $d_{Ac,DL}$. If the identifier for the common data $d_{Ac,DL}$ is the common identifier, the common identifier is a multicast identifier indicating both the UE A and the UE B. A control signal including the common identifier may further include user identifier information for each of a plurality of UEs participating in cooperation. The control signal $C_{Ac,DL}$ may be transmitted by being CRC-masked with a user identifier. In this case, the user identifier may be the identifier of the UE A or the common identifier if the BS A transmits the control signal $C_{Ac,DL}$. The user identifier may be the identifier of the UE B or the common identifier if the BS B transmits the control signal $C_{Ac,DL}$. By CRC checking, the UE B can determine whether the control signal $C_{Ac,DL}$ is a control signal transmitted to the UE B.

The control signal $C_{Ac,DL}$ may include a valid flag. The valid flag is a bit for indicating whether data is for a corresponding UE. For example, if the common data $d_{Ac,DL}$ is transmitted with the common identifier, the BS A may set the flag to 'on' so that the UE A can process the common data $d_{Ac,DL}$ as data of the UE A. In addition, the BS B may set the flag to 'off' so that the UE B can restore the common data $d_{Ac,DL}$, remove interference from the data, and discard the data.

Figure 7:
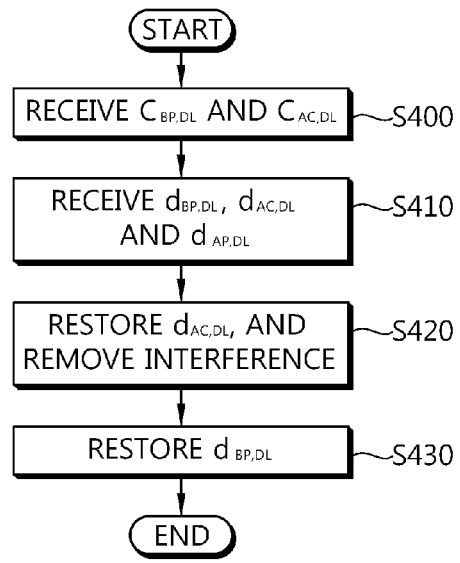
FIG. 7 is a flowchart showing a method of processing downlink data according to an embodiment of the present invention.

FIG. 7 is a flowchart showing a method of processing DL data according to an embodiment of the present invention. For convenience of explanation, the following description will be based on the cells and users exemplified in FIG. 2.

Referring to FIG. 7, a UE B receives a control signal $C_{Bp,DL}$ (i.e., a first control signal) for private data $d_{Bp,DL}$ (i.e., first DL data) of the UE B and a control signal $C_{Ac,DL}$ (i.e., a second control signal) for common data $d_{Ac,DL}$ (i.e., second DL data) of a UE A (step S400). The control signal $C_{Ac,DL}$ may be transmitted by a BS B to the UE B by exchanging signals between a BS A and the BS B, or may be directly transmitted by the BS A to the UE B.

The UE B receives the private data $d_{Bp,DL}$ of the UE B from the BS B, and receives private data $d_{Ap,DL}$ and common data $d_{Ac,DL}$ of the UE A from the BS A (step S410). The private data $d_{Ap,DL}$ and the common data $d_{Ac,DL}$ are data transmitted by the BS A to the UE A. However, since the UE B is located at a boundary of a cell A and a cell B, the UE B can receive the private data $d_{Ap,DL}$ and the common data $d_{Ac,DL}$.

After restoring the common data $d_{Ac,DL}$ in a state where interference caused by the private data $d_{Ap,DL}$ and private data $d_{Bp,DL}$ exist, the UE B removes interference caused by the common data $d_{Ac,DL}$ (step S420). The UE B can restore the common data $d_{Ac,DL}$ by the control signal $C_{Ac,DL}$ received in step S400.

The UE B can restore the private data $d_{Bp,DL}$ in a state where interference caused by the common data $d_{Ac,DL}$ is removed (step S430). The UE B can restore the private data $d_{Bp,DL}$ by the control signal $C_{Bp,DL}$ received step S400.

The UE B may include a radio frequency (RF) unit and a processor. The RF unit transmits and receives a radio signal. The processor is coupled to the RF unit. The processor receives the control signal $C_{Bp,DL}$ for the private data $d_{Bp,DL}$ and the control signal $C_{Ac,DL}$ for the common data $d_{Ac,DL}$, receives the private data $d_{Bp,DL}$ from a serving cell, receives the common data $d_{Ac,DL}$ for a neighbor cell, removes interference from the neighbor cell by restoring the common data $d_{Ac,DL}$, and restores the private data $d_{Bp,DL}$ in a state where the interference from the neighbor cell is removed.

Accordingly, an effective control mechanism and a control signal required for DL data transmission can be obtained in a multi-cell cooperative wireless communication system.

Next, a control signal used for transmitting and processing UL data in a wireless communication system supporting inter-cell cooperation will be described.

Figure 8:
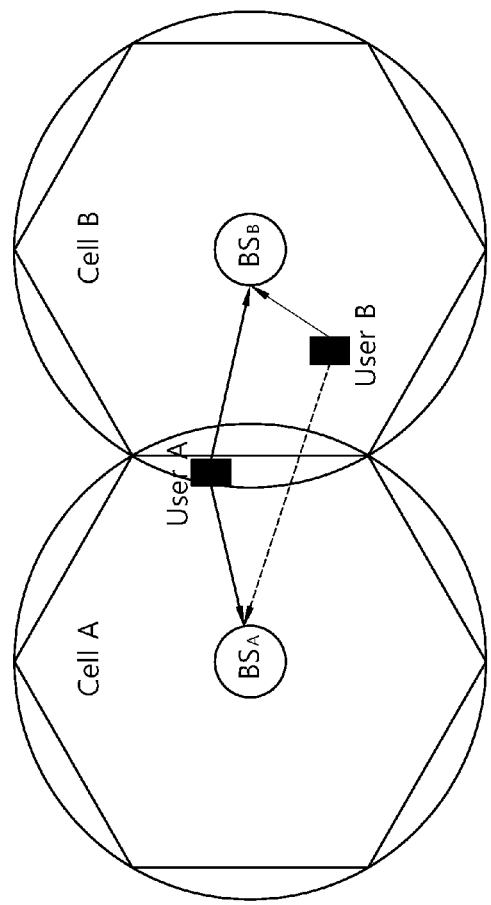
FIG. 8 shows an operation of transmitting uplink data based on inter-cell cooperation.

FIG. 8 shows an operation of transmitting UL data based on inter-cell cooperation.

Referring to FIG. 8, a user A is located at a boundary of a cell A, and a user B is located in a center of a cell B. A BS A belongs to the cell A, and a BS B belongs to the cell B. From the perspective of the user A, the cell A is a serving cell, and the cell B is a neighbor cell. From the perspective of the user B, the cell B is a serving cell, and the cell A is a neighbor cell. The cell A and the cell B use the same time and frequency bands, and the user A is located in the boundary of the cell A. Thus, the cell A may produce strong interference to the cell B in UL data transmission. Since the user B is located in the center of the cell B, the user B may produce relatively weak interference to the cell A. The cell A and the cell B can share scheduling information for time and frequency resources. It is assumed that the cell A intends to reduce UL interference acting on the user B. The following description on the present invention is for exemplary purposes only, and thus the present invention also applies to a case where the user A is located in the cell center and the user B is located in the cell boundary.

Figure 9:
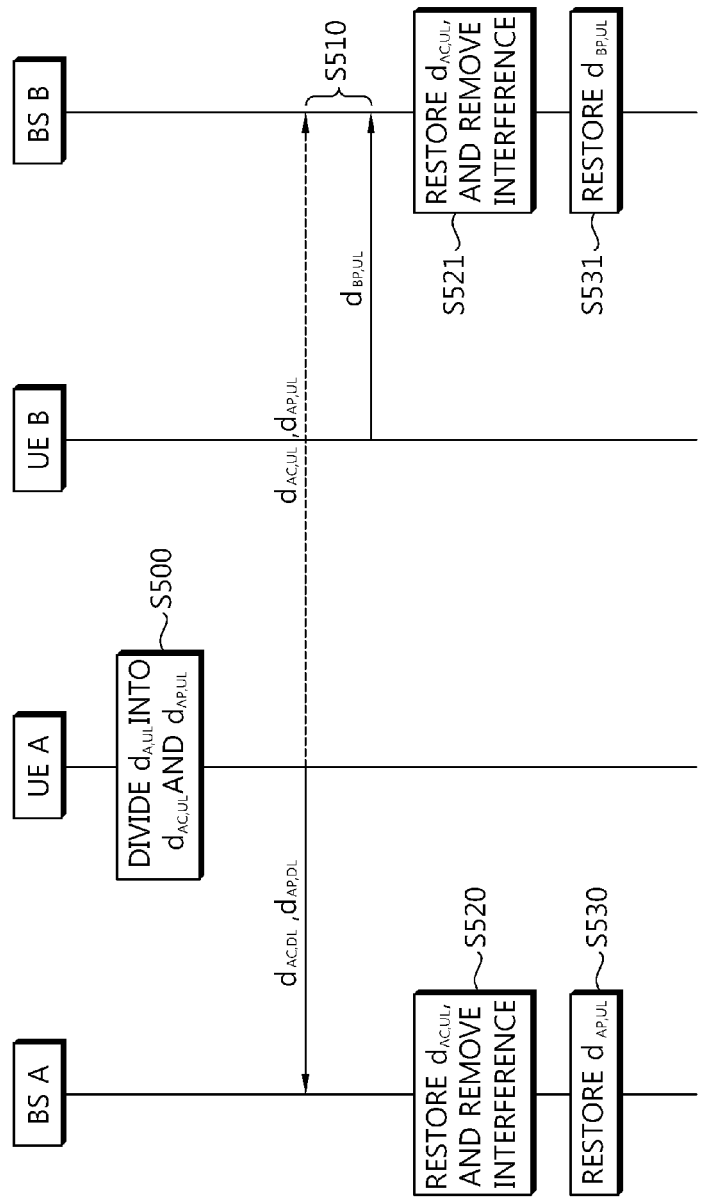
FIG. 9 is a flowchart showing a method of transmitting uplink data based on inter-cell cooperation according to an embodiment of the present invention.

FIG. 9 is a flowchart showing a method of transmitting UL data based on inter-cell cooperation according to an embodiment of the present invention. For convenience of explanation, the following description will be based on the cells and users exemplified in FIG. 8. However, a user location is not limited thereto.

Referring to FIG. 9, a UE A divides UL data $d_{A,UL}$ into common data $d_{Ac,UL}$ and private data $d_{Ap,UL}$ (step S500). The UL data $d_{A,UL}$ is data to be transmitted by the UE A to a BS A. The common data $d_{Ac,UL}$ is defined as data that can be restored both in a serving cell (i.e., a cell A) and a neighbor cell (i.e., a cell B) of the UE A. The private data $d_{Ap,UL}$ is defined as data that can be restored in the cell A but cannot be restored in the cell B.

The UE A transmits the common data $d_{Ac,UL}$ and private data $d_{Ap,UL}$ of the UE A to the BS A, and a UE B transmits private data $d_{Bp,UL}$ of the UE B to a BS B by a radio resource overlapping with that used for the UE A (step S510). The common data $d_{Ac,UL}$ and the private data $d_{Ap,UL}$ are data transmitted to the BS A. Since the UE A is located near a boundary of the cell A and the cell B, the common data $d_{Ac,UL}$ and private data $d_{Ap,UL}$ of the UE A can be received by the BS B.

The BS A restores the common data $d_{Ac,UL}$ in a state where interference caused by the private data dAp,UL of the UE A exists, and removes resultant interference (step S520). The BS B restores the common data $d_{Ac,UL}$ in a state where interference caused by the private data $d_{Ap,UL}$ of the UE A and the private data $d_{Bp,UL}$ of the UE B exists, and removes resultant interference (step S521). After removing the interference in step S520, the BS A recognizes the common data $d_{Ac,UL}$ as data of the BS A, and performs a suitable process. After removing the interference in step S521, the BS B utilizes or discards the common data $d_{Ac,UL}$.

After removing the interference, the BS A restores the private data $d_{Ap,UL}$ of the UE A (step S530). After removing the interference, the BS B restores the private data $d_{Bp,UL}$ of the UE B (step S531).

Accordingly, from the perspective of the BS B, there is an advantage as if the UE A transmits UL data by decreasing power to reduce interference acting on the BS B. In addition, from the perspective of the UE A, Tx power and a data rate can be maintained to the maximum extent possible while minimizing interference on the BS B.

As described above with reference to FIG. 9, the UE can transmit the UL data to multiple layers divided for private data and common data. Therefore, there is a need to define a new control signal for UL data transmission and a new method of transmitting the control signal.

Figure 10:
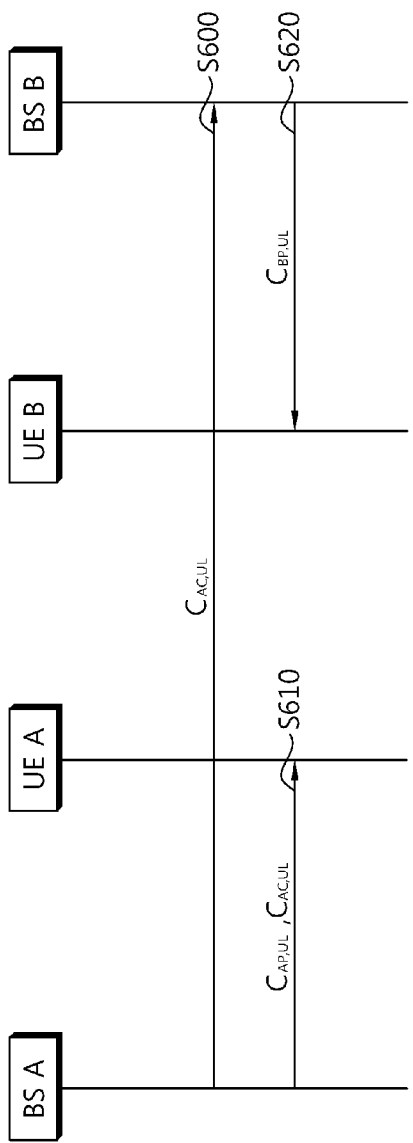
FIG. 10 is a flowchart showing a method of transmitting a control signal for uplink data transmission according to an embodiment of the present invention.

FIG. 10 is a flowchart showing a method of transmitting a control signal for UL data transmission according to an embodiment of the present invention. For convenience of explanation, the following description will be based on the cells and users exemplified in FIG. 8. However, a user location is not limited thereto. In case of UL data transmission, a BS may transmit a control signal by adding control information to the control signal. The control signal is for scheduling UL data transmission of UEs belonging to a cell of the BS, and the control information is for data divided for multiple layers according to the embodiment of the present invention.

Referring to FIG. 10, a BS A transmits to a BS B a control signal $C_{Ap,UL}$ (i.e., a first control signal) for private data $d_{Ap,UL}$ (i.e., first UL data) of a UE A and/or a control signal $C_{Ac,UL}$ (i.e., a second control signal) for common data $d_{Ac,UL}$ (i.e., second UL data) (step S600). Data transmission between the BS A and the BS B may use a wired link through which the BSs are connected. On the basis of the control signal received in step S600, the BS B can determine a control signal $C_{Bp,UL}$ (i.e., a third control signal) for private data $d_{Bp,UL}$ (i.e., third UL data) of a UE B.

The BS A transmits to the UE A the control signal $C_{Ap,UL}$ for the private data $d_{Ap,UL}$ of the UE A and the control signal $C_{Ac,UL}$ for the common data $d_{Ac,UL}$ (step S610). The BS B transmits to the UE B the control signal $C_{Bp,UL}$ for the private data $d_{Bp,UL}$ of the UE B (step S620). Steps S610 and S620 can be performed simultaneously.

The common data $d_{Ac,UL}$ of the UE A is data transmitted by the UE A to the BS A. Since the UE A is located at a boundary of a cell A and a cell B, the data transmitted by the UE A can be received by the BS B. Accordingly, the BS B needs to receive control information for restoring the common data $d_{Ac,UL}$. On the basis of the control information received from the BS A, the BS B can perform scheduling for UL data transmission of the UE B. An MCS level for the UL data of the UE B may be set to be high by considering that interference caused by the UE A can be removed.

The control signal $C_{Ac,UL}$ may include information required for restoration of the common data $d_{Ac,UL}$. Specifically, the control signal $C_{Ac,UL}$ may include radio resource region information, an MCS level, RS information, a user identifier, etc.

The control signal $C_{Ac,UL}$ may include information on a radio resource region for carrying common data $d_{Ac,UL}$.

The control signal $C_{Ac,UL}$ may include an MCS level. The common data $d_{Ac,UL}$ has to be restorable by both the BS A and the BS B. Therefore, among MCS levels that can be received by the BS A and the BS B, the MCS level of the common data $d_{Ac,UL}$ has to be set to an MCS level having a low data rate.

The control signal $C_{Ac,UL}$ may include RS information. The BS B can estimate a channel by the RS information, and can calculate a value for data restore. The BS B receives the private data $d_{Bp,UL}$ from the UE B, and receives the common data $d_{Ac,UL}$ from the UE A. Therefore, the RS information differs for each of the private data $d_{Bp,UL}$ and the common data $d_{Ap,UL}$. In addition, from the perspective of the BS A, the BS A receives the private data $d_{Ap,UL}$ and the common data $d_{Ac,UL}$ from the UE A. In this case, for effective channel estimation, the RS information may differ for each of the private data $d_{Ap,UL}$ and the common data $d_{Ac,UL}$. Examples of the RS information include an RS index, a cell index, a user index, an RS pattern, etc.

The control signal $C_{Ac,UL}$ may include a user identifier. The common data $d_{Ac,UL}$ received by the BS B from the UE A is data for the BS A. Therefore, in order to restore the data received by the BS B, the user identifier is required to indicate a specific UE for which data is transmitted. An identifier for the common data $d_{Ac,UL}$ of the UE A may be an identifier of the UE A or a common identifier. If the user identifier for the common data $d_{Ac,UL}$ is the identifier of the UE A, the BS A or the UE A has to inform the BS B of the fact that the identifier of the UE A is used for the common data $d_{Ac,UL}$. If the user identifier for the common data $d_{Ac,UL}$ is the common identifier, the BS A has to inform the UE A and BS B of the fact that the common identifier is used for the common data $d_{Ac,UL}$. The common identifier is a multicast identifier including the UE A and the UE B. A control signal including the common identifier may further include user identifier information for each of a plurality of UEs participating in cooperation.

Unlike in DL data transmission, the control signal $C_{Ac,UL}$ for UL data transmission does not include a valid flag. Data is received by the BS in UL data transmission. Whether to discard the common data $d_{Ac,UL}$ may be determined by the BS B in cooperation with the BS A. Therefore, additional control information for determining whether to discard the common data $d_{Ac,UL}$ is not necessary.

Upon receiving the control signals $C_{Ac,UL}$ and $C_{Ap,UL}$ in step S600, the UE A transmits to the BS A the common data $d_{Ac,UL}$ and the private data $d_{Ap,UL}$ on the basis of the control signals. If the control signal $C_{Ac,UL}$ instructs to use the user identifier as the common identifier, the UE A transmits the common data $d_{Ac,UL}$ by the common identifier.

Accordingly, a control signal required for UL data transmission and an effective control mechanism can be obtained in a multi-cell cooperative wireless communication system.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of processing data in a multi-cell cooperative wireless communication system, the method performed by a user equipment (UE) and comprising:

receiving a first control signal for first downlink data and a second control signal for second downlink data;

receiving the first downlink data from a serving cell as well as the second downlink data from a neighbor cell, respectively, wherein the first downlink data and the second downlink data interfere with each other, wherein the first downlink data is user data for the UE and the second downlink data is a common portion of user data for another UE but is decodable by the another UE as well as the UE, and wherein the user data for the another UE is divided into the common portion and a private portion which is decodable by the another UE, but not by the UE;

decoding the second downlink data received from the neighbor cell; and decoding the first downlink data by removing the interference, which is caused by the first downlink data, from the first downlink data based on the decoded second downlink data.

2. The method of claim 1, wherein the second control signal is received from the serving cell or the neighbor cell.

3. The method of claim 1, wherein the second control signal comprises information required for restore of the second downlink data.

4. The method of claim 2, wherein the second control signal comprises at least one of radio resource region information, an MCS level, RS information, a user identifier, and a flag indicating whether the second downlink data needs to be discarded after restore.

5. The method of claim 4, wherein the RS information comprises at least one of an RS index, a cell index, a user index, and an RS pattern.

6. The method of claim 4, wherein, if the flag is '1', the second downlink data is regarded as data of a corresponding user equipment, and if the flag is '0', the second downlink data is discarded.

7. The method of claim 1, wherein the second control signal is CRC-masked with a user identifier.

8. A user equipment comprising:
a radio frequency (RF) unit for transmitting and receiving a radio signal; and
a processor connected to the RF unit and configured to:
receive a first control signal for first downlink data and a second control signal for second downlink data,
receive the first downlink data from a serving cell as well as the second downlink data from a neighbor cell, respectively,
wherein the first downlink data and the second downlink data interfere with each other,
wherein the first downlink data is user data for the UE and the second downlink data is a common portion of user data for another UE but is decodable by the another UE as well as the UE, and
wherein the user data for the another UE is divided into the common portion and a private portion which is decodable by the another UE, but not by the UE;
decode the second downlink data received from the neighbor cell, and
decode the first downlink data by removing the interference, which is caused by the first downlink data, from the first downlink data based on the decoded second downlink data.

* * * * *